(12) United States Patent
Hakaste

(10) Patent No.: US 6,813,355 B1
(45) Date of Patent: Nov. 2, 2004

(54) METHOD AND ARRANGEMENT FOR CIPHERING INFORMATION TRANSFER

(75) Inventor: Markus Hakaste, Helsinki (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/249,475

(22) Filed: Feb. 12, 1999

(30) Foreign Application Priority Data

Feb. 13, 1998 (FI) .................................................. 980339

(51) Int. Cl.[7] .............................................. H04K 1/00
(52) U.S. Cl. ..................................... 380/270; 380/273
(58) Field of Search ................................. 380/270, 261, 380/273

(56) References Cited

U.S. PATENT DOCUMENTS

| | | | | |
|---|---|---|---|---|
| 5,008,938 A | * | 4/1991 | Freeburg et al. ............ | 380/265 |
| 5,018,197 A | * | 5/1991 | Jones et al. .................. | 380/239 |
| 5,410,599 A | * | 4/1995 | Crowley et al. ............. | 380/269 |
| 5,450,547 A | * | 9/1995 | Nguyen et al. .............. | 713/600 |
| 5,511,123 A | | 4/1996 | Adams ......................... | 380/29 |
| 5,594,795 A | * | 1/1997 | Dent et al. ................... | 380/247 |
| 5,594,797 A | | 1/1997 | Alanara et al. ............... | 380/28 |
| 5,638,445 A | | 6/1997 | Spelman et al. ............. | 380/21 |
| 5,740,075 A | * | 4/1998 | Bigham et al. .............. | 709/229 |
| 5,825,889 A | * | 10/1998 | Dent ........................... | 380/270 |
| 6,069,956 A | * | 5/2000 | Kurihara ...................... | 380/212 |
| 6,128,707 A | * | 10/2000 | Arimilli et al. ............... | 710/35 |
| 6,192,026 B1 | * | 2/2001 | Pollack et al. ............... | 370/203 |
| 6,192,129 B1 | * | 2/2001 | Coppersmith et al. ...... | 380/259 |
| 6,243,470 B1 | * | 6/2001 | Coppersmith et al. ...... | 380/259 |
| 6,259,789 B1 | * | 7/2001 | Paone .......................... | 380/28 |

FOREIGN PATENT DOCUMENTS

| | | |
|---|---|---|
| EP | 0 518 315 A3 | 12/1992 |
| GB | 2 264 373 A | 8/1993 |
| WO | WO 95/10906 | 4/1995 |
| WO | WO 98/00949 | 1/1998 |

OTHER PUBLICATIONS

The Microsoft Press Computer Dictionary 1997, Microsoft Press, 3rd ed., pp. 67–68.*
ETSI STC SMG2 Edge Tdoc 332/97: Feasibility Study version 1.0, Work Item 184: "Improved Data Rates through Optimised Modulation", Ericsson, Nokia, Dec. 1–5, 1997.
ETS 300 929: GSM 03.20—version 5.1.1. Annex C "External Specifications of security related algorithms" pp. 46–48.
Finnish Office Action.

* cited by examiner

Primary Examiner—Douglas J Meislahn
(74) Attorney, Agent, or Firm—Perman & Green, LLP

(57) ABSTRACT

The invention relates to a method and arrangement for ciphering an information transfer connection. The invention can be advantageously applied in a TDMA (Time Division Multiple Access) cellular system offering broadband circuit switched services. An essential idea of the invention is that the information to be ciphered in a transmission burst is divided into at least two blocks (730) and said blocks are ciphered in ways that are not identical with each other (750 to 770). Then the reliability of ciphering is better because the amount of information encoded using one and the same ciphering algorithm and key is smaller. In addition, the reliability of the ciphering can be varied by changing the number and/or size of the information blocks in a burst.

9 Claims, 5 Drawing Sheets

METHOD AND ARRANGEMENT FOR CIPHERING INFORMATION TRANSFER

BACKGROUND OF THE INVENTION

The invention relates to a method and arrangement for ciphering information transfer. The invention can be advantageously applied in a time division multiple access (TDMA) cellular system offering broadband circuit switched services.

The prior art will be now described, discussing first the use of time slots in the GSM (Global System for Mobile communications) system and the coding of information in a burst transferred in a time slot. Then it will be described a known method for ciphering information transfer in said system as well as the disadvantages related to it.

Current mobile communication networks generally use the time division multiple access (TDMA) method. For example, in the GSM system each traffic channel uses TDMA frames comprising eight time slots. In mobile communication systems a call is conventionally established in such a manner that one time slot is reserved for the call and the transmission channel provided by that time slot is then used for the whole duration of the call. If, however, the mobile station moves from the area of a base station to that of another, a handover is carried out and a channel using a new time slot is established between the new active base station and the mobile station.

FIG. 1 shows a GSM TDMA frame comprising eight time slots 0 to 7. Separately shown are transmission frame TX and reception frame RX. Here, transmission frame means a frame sent by the mobile station, i.e. an uplink TDMA frame, and reception frame means a frame received by the mobile station, i.e. a downlink TDMA frame. A cross in FIG. 1 marks the time slot 1 which in the call depicted by the example is used in both uplink and downlink transmission. It should be noted that in the downlink and uplink directions there is a delay between the frames, which is why time slots represented by corresponding numbers are not simultaneous in the different transfer directions.

Broadband high speed circuit switched data (HSCSD) services, in which a call uses more than one time slot in order to speed up the communications rate, have been introduced especially for data transmission services. The number of uplink time slots may be equal to that of downlink time slots, in which case the configuration is symmetrical, or it may be unequal, in which case the configuration is asymmetrical. Time slots used are specified during call establishment and the system indicates the time slots used as well as the related parameters to the mobile station. Said parameters include, for example, the ciphering key used in ciphering/deciphering. The number of time slots used can also be changed during a call.

FIG. 2 shows a TDMA frame in conjunction with a HSCSD call using two time slots 1 and 2 in the uplink direction TX and three time slots 0 to 2 in the downlink direction RX.

FIG. 3 illustrates the use of a time slot in the GSM system. A burst transferred in a time slot contains training sequence symbols TSS 33, two sequences IS1 and IS2 consisting of information symbols, 31 and 32, and tail symbols TS1 and TS2, 30 and 34, respectively. In addition, time slots are separated by guard periods GP, 35. A conventional GSM system uses GMSK modulation to modulate the data into the burst.

Furthermore, there are new solutions to increase the transfer capacity by changing the method of modulation of the burst transmitted in a time slot. One such solution is the so-called EDGE (Enhanced Data rates for GSM Evolution) system which is now being developed and is based on the GSM system. In that solution, GMSK modulation may be replaced by binary order quadrature amplitude modulation (B-O-QAM), quadrature order quadrature amplitude modulation (Q-O-QAM) or by code pulse modulation (CPM), for example. Possible characteristics of the EDGE system are described e.g. in [1]. To illustrate the invention we will examine in this patent application some of the arrangements to implement the EDGE system discussed in said document. Those arrangements will be below called the "EDGE system" although the characteristics of the eventual implemented EDGE system might be different from those described here.

When using fast modulation, the symbol rate can be generated from a 13-MHz clock frequency by dividing by 36, for example, while in the conventional GSM system the divisor is 48. Thus the symbol rate becomes 361.111 ksps (kilosymbols per second). When using Q-O-QAM modulation, a symbol comprises 2 bits, so the modulation bit rate is 722.222 kbps (kilobits per second). When using B-O-QAM modulation, a symbol comprises one bit, so the modulation bit rate is 361.111 kbps.

Table 1 below lists the most important modulation characteristics of the GSM system and the system using QAM modulation.

TABLE 1

| Modulation | GSM | B-O-QAM | Q-O-QAM |
| --- | --- | --- | --- |
| Time slot length | 576.92 $\mu$s | 576.92 $\mu$s | 576.92 $\mu$s |
| Clock frequency divisor | 48 | 36 | 36 |
| Symbol rate | 270.833 ksps | 361.111 ksps | 361.111 ksps |
| Symbol sequence length | 3.692 $\mu$s | 2.769 $\mu$s | 2.769 $\mu$s |
| Modulation bit rate | 270.833 kbps | 361.111 kbps | 722.222 kbps |
| Symbols in burst | 156.25 | 208.333 | 208.333 |
| Symbols in TDMA frame | 1250 | 1666.666 | 1666.666 |

So, using QAM modulation, a burst in one time slot can transfer 208.333 symbols, whereas the GSM system can only transfer 156.25 symbols.

Table 2 below shows the time slot sequence lengths in the GSM system and in the system based on QAM modulation. The portion of the stealing flag is shown separately in the numbers of information symbols and bits.

TABLE 2

| Modulation | GSM | B-O-QAM | Q-O-QAM |
| --- | --- | --- | --- |
| Tail symbols /TS | 3 | 2 | 2 |
| Information symbols /IS | 57 + 1 | 81 + 1 | 81 + 1 |
| Information symbols /burst | 114 + 2 | 162 + 2 | 326 + 2 |
| Symbols in training sequence /TSS | 26 | 28 | 28 |
| Guard period GP | 8.25 (30.462 $\mu$s) | 12.333 (34.153 $\mu$s) | 12.333 (34.153 $\mu$s) |

In the GSM system the ciphering of information transferred is based on the use of the so-called A5 ciphering algorithm. The ciphering algorithm is used to produce a 114-bit pseudo-random ciphering sequence which is used to encrypt the 114 information bits transferred in one burst. A ciphered 114-bit sequence is produced by performing an exclusive-or (xor) operation between the unciphered information and the ciphering sequence. Similarly, the ciphered information is deciphered at the receiving end by producing the same ciphering sequence and carrying out an xor operation between the ciphering sequence and the received bit sequence.

The A5 algorithm is not public but as regards its structure it is a conventional ciphering algorithm using two input parameters. The first input parameter, so-called COUNT value, is derived from the TDMA frame number and transferred on the synchronization channel SCH. The COUNT value is used for producing ciphering blocks for bursts in sequential TDMA frames. The second input parameter is a call specific ciphering key Kc which is transferred on a data transmission channel prior to call establishment.

Different connections and time slots within a TDMA frame are distinguished using separate ciphering keys. If a connection uses more than one time slot, ciphering key Kc is used in time slot 0 if that is in use. In addition, ciphering key Kc is used to produce the ciphering keys Kcn (n=0 to 7) for the other time slots.

The method above is used for creating for all bursts different ciphering bit blocks within a TDMA frame and between TDMA frames. The use of multiple input parameters in the A5 algorithm makes it possible to avoid long text sequences ciphered with one and the same ciphering block. This way, the encryption function of the conventional GSM system can be made comparatively reliable.

Ciphering methods for the GSM system are described in more detail in [2], chapter 4.

Prior-art arrangements, however, have limitations. The reliability of encryption largely depends on how much information is transferred using the same ciphering algorithm and key. The greater the amount of information transferred using the same algorithm/key, the easier it is to crack the encryption. In known arrangements one and the same ciphering algorithm and key are used to code one burst. When the amount of information in the burst is fixed, the encryption has a certain pre-determined reliability. Thus, known arrangements do not allow selection of the reliability level of encryption according to need.

Also, when using modulation methods in which greater amounts of data are modulated into one burst, the reliability of the encryption becomes lower. A situation may then occur in which the reliability of encryption is inadequate.

Furthermore, known solutions have the disadvantage that when new modulation methods are introduced, longer information blocks and ciphering sequences have to be handled in conjunction with ciphering, which may call for changes in the transmitter and receiver construction.

SUMMARY OF THE INVENTION

An object of the present invention is to avoid aforementioned disadvantages of the prior art by providing an arrangement in which the attainable reliability of encryption is better than in known solutions and in which the level of reliability of encryption can be changed if desired.

An essential idea of the invention is that the information transferred in a burst is divided into at least two blocks and said blocks are ciphered in a non-identical manner. Then the ciphering reliability is better as the amount of information encoded with one and the same ciphering algorithm and key is smaller. Furthermore, the level of ciphering reliability can be changed by altering the number and/or size of information blocks in the burst. Since the information block size can be e.g. 114 bits, which is used in the GSM system, application of the invention will not require that the construction of the mobile station be made more complex.

FIG. 4 shows in general an arrangement according to the invention for ciphering the information related to a burst. A block contains Y information bits of a burst to be ciphered, divided into s+1 sub-blocks each of which comprises y bits. Sub-blocks are created in accordance with predetermined rules. In the example depicted in FIG. 4, the bits to be transferred first are transferred in the first sub-block, the bits to be transferred second are transferred in the second sub-block, etc. However, other ways of forming the sub-blocks can be applied, too. Since in the situation according to FIG. 4 the number of information bits in a burst, i.e. the block size Y, is a multiple of the number of bits y in a sub-block, all sub-blocks are of the same length. A ciphering sequence block 0 to s is formed for each sub-block in a manner described later on. An xor operation is performed between the information bits and ciphering bits, producing Y ciphered information bits for one burst.

FIG. 5 shows a situation in which an information bit block related to a burst, comprising Y bits to be ciphered, is divided into sub-blocks 114 bits long. In this case the block size Y is not a multiple of the number of bits y in a sub-block, so the last sub-block s will not be full. As the number of bits in one burst may not necessarily be divisible by 114, the last sub-block s may comprise less than 114 bits. The remaining bits are the most significant bits of the last sub-block and they are binary added to the corresponding bits of the last ciphering block. The ciphering sequence blocks are generated in the same manner as in the situation depicted in FIG. 4, producing after an xor operation a block of Y ciphered information bits for one burst.

The method according to the invention for ciphering a TDMA data transfer call, wherein transferred information is modulated into at least one burst of a TDMA frame and transferred information is ciphered using a predetermined algorithm and ciphering key, is characterized in that information transferred in one burst is divided into at least two blocks, the first block is ciphered using a first ciphering key, the second block is ciphered using a second ciphering key, and said first and second ciphering keys are different from each other.

The arrangement according to the invention for ciphering a TDMA information transfer connection in a communications system, comprising means for modulating the information to be transferred into at least one burst of a TDMA frame and means for ciphering the information to be transferred using a predetermined algorithm and at least one ciphering key, is characterized in that it further comprises means for dividing the information transferred in said burst into at least two blocks, and means for ciphering the first block using a first ciphering key and the second block using a second ciphering key, said first and second ciphering keys being different from each other.

The mobile station according to the invention, comprising means for ciphering a TDMA information transfer connection, including means for modulating the information to be transferred into at least one burst of a TDMA frame and means for ciphering the information to be transferred using a predetermined algorithm and at least one ciphering key, is characterized in that the mobile station further comprises means for dividing the information transferred in said burst into at least two blocks, and means for ciphering the first block using a first ciphering key and the second block using a second ciphering key, said first and second ciphering keys being different from each other.

Preferred embodiments of the invention are described in the dependent claims.

BRIEF DESCRIPTION OF THE DRAWING

Embodiments of the invention will now be described in more detail with reference to the accompanying drawing wherein

FIGS. 1 to 3 were already discussed above in conjunction with the description of the prior art, and FIGS. 4 and 5 were discussed in conjunction with the general description of the invention.

DETAILED DESCRIPTION OF THE INVENTION

Figure 1:
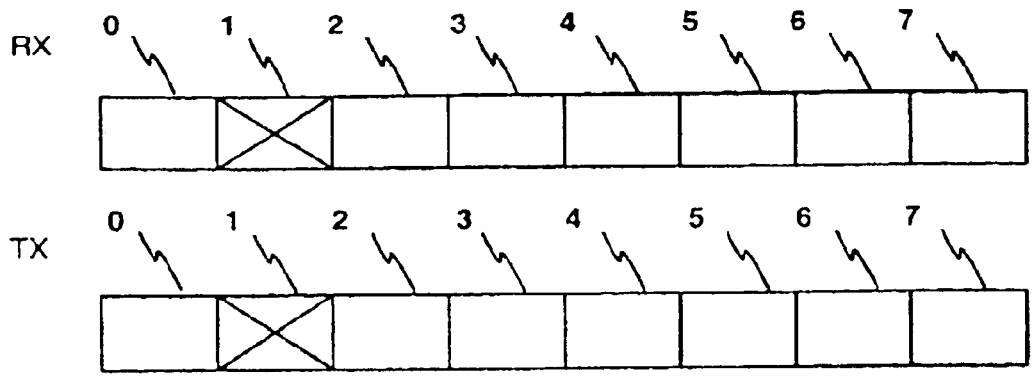
FIG. 1 shows the allocation of a time slot in a TDMA frame in a conventional connection using one time slot.
Figure 2:
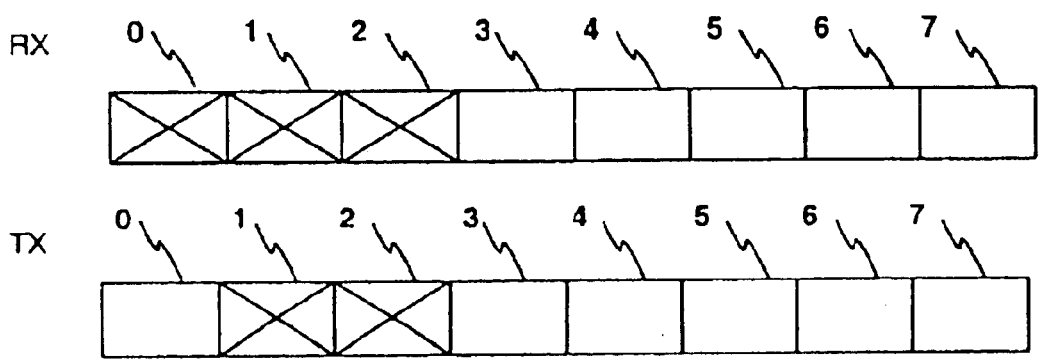
FIG. 2 shows the allocation of time slots in a TDMA frame in a HSCSD connection using multiple time slots.
Figure 3:
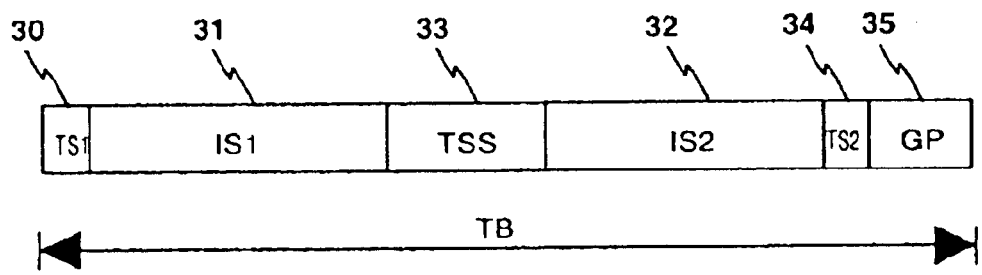
FIG. 3 illustrates time slot usage in the GSM system.
Figure 4:
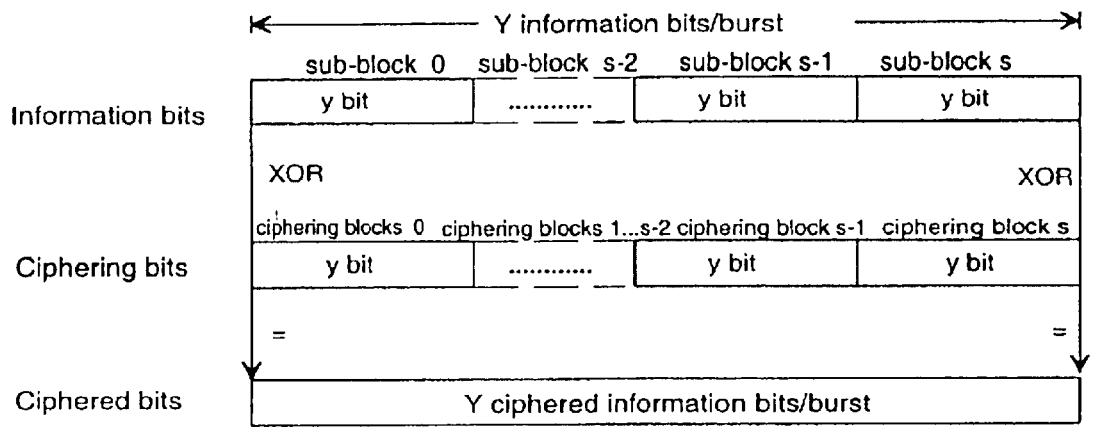
FIG. 4 illustrates in accordance with the invention ciphering of information encoded into a burst when the burst comprises an evenly divisible number of information blocks.
Figure 5:
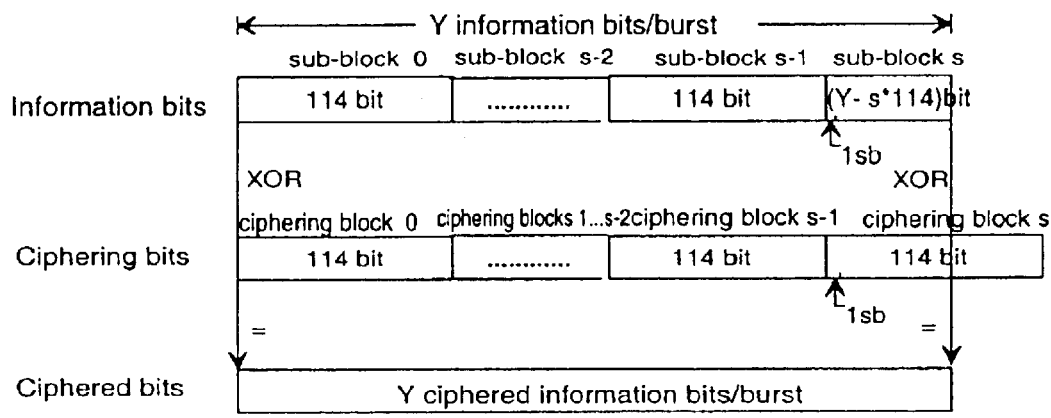
FIG. 5 illustrates in accordance with the invention ciphering of information encoded into a burst when the number of information blocks in the burst is not an evenly divisible figure.
Figure 6:
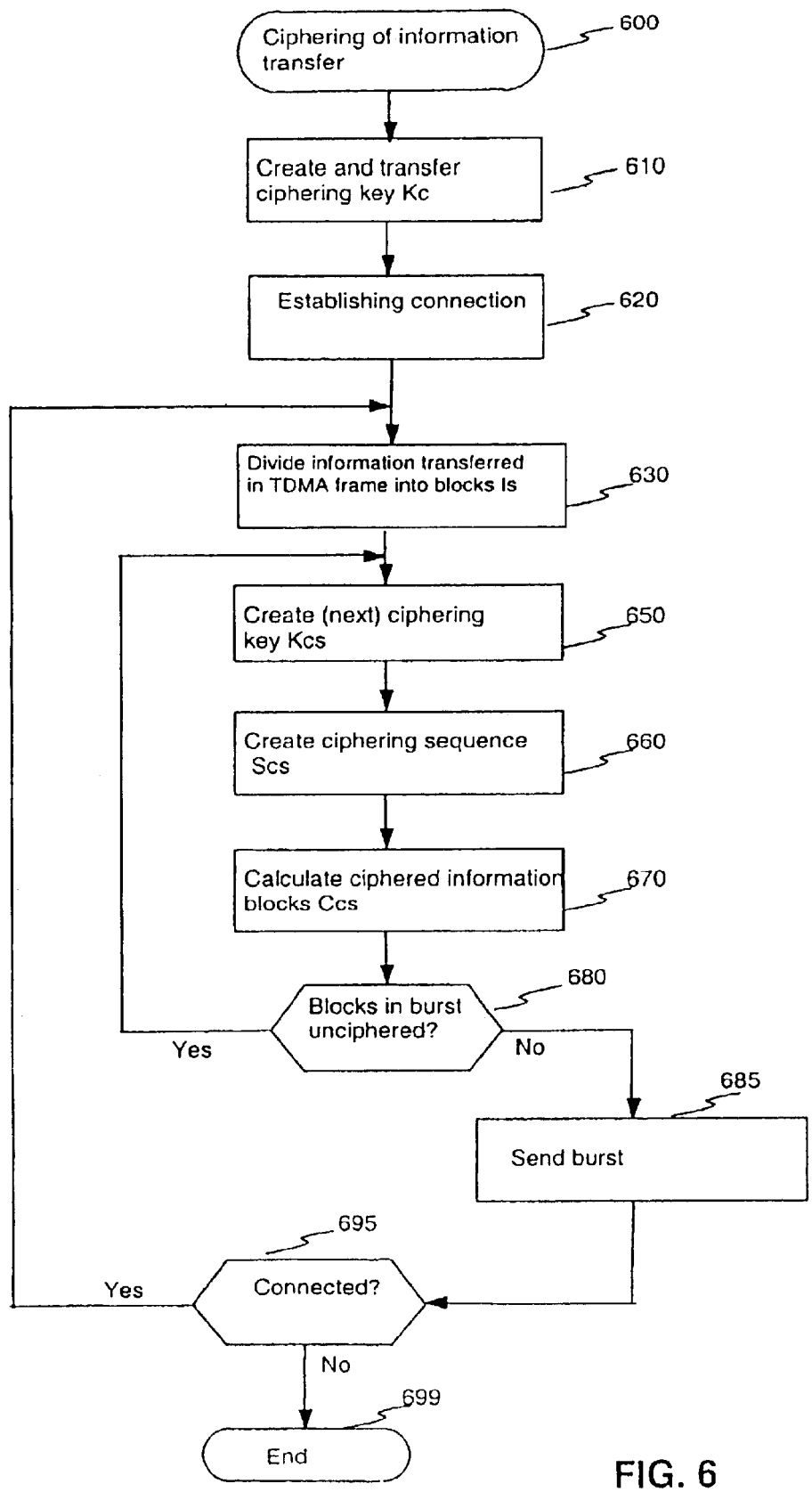
FIG. 6 shows in the form of flow diagram a method according to the invention for ciphering information transfer when the connection uses one time slot.

Referring to FIG. 6, it will be now described in more detail a method according to the invention for ciphering information transfer on a communications connection using one time slot, and referring to FIG. 7, it will be described a method according to the invention for a communications connection using multiple time slots. Then, referring to FIG. 8, it will be described an arrangement for realizing a mobile station according to the invention.

FIG. 6 shows a method according to the invention for ciphering a connection using one time slot, 600. First, a connection specific ciphering key Kc is created and transferred on the information transfer channel so that both the transmitter and receiver use the same connection key, step 610. In conjunction with that, normal call establishment is carried out, step 620. Information to be transferred is divided into blocks the size of which in the example case is 114 bits, step 630.

Next, a block specific ciphering key Kcs is created in step 650. The first 114-bit block is advantageously encoded using the same ciphering sequence as in the normal single-slot case because Kc0=Kc. For all subsequent sub-blocks 1 to s it is used distinct ciphering sequences derived from the corresponding connection specific ciphering keys Kc1 to Kcs.

The block specific ciphering key is created using the connection specific ciphering key Kc and the sub-block number BM as follows:

$$Kcs(i)=Kc(i) xor BMs(i) \tag{1}$$

In the equation above, xor stands for bitwise binary addition. BM(i) stands for 64-bit binary encoding of the sub-block number BM. The sub-block number may obtain values in the range 0 to DIV(Y,114), where Y is the total number of information bits to be ciphered in one burst, i.e. the block size. Index s denotes the sub-block index and i denotes binary form.

In a system using the new modulation method the number of information bits to be ciphered in the burst is advantageously 200 to 400. If the number of bits to be ciphered is e.g. 300, the number of sub-blocks is DIV(300,114)=2. Then the sub-block numbers 0, 1 and 2 are binary-encoded such that the bit sequence contains 62 zeros followed by the two least significant bits, which have the value 00, 01 or 10, depending on the sub-block.

Using a block specific ciphering key, a block specific ciphering sequence Scs is created, step 660. After that, an information sub-block is ciphered using the ciphering sequence block, producing a ciphered information block Ccs.

If there are still information blocks in the burst to be ciphered, operation returns to step 650. When all information blocks in the burst have been ciphered, 680, the ciphered information blocks are modulated into the burst and the burst is transmitted to the information transfer channel, step 685. Steps 630 to 685 are continued until the connection is terminated, 699.

A received burst is decoded following corresponding deciphering steps.

Figure 7:
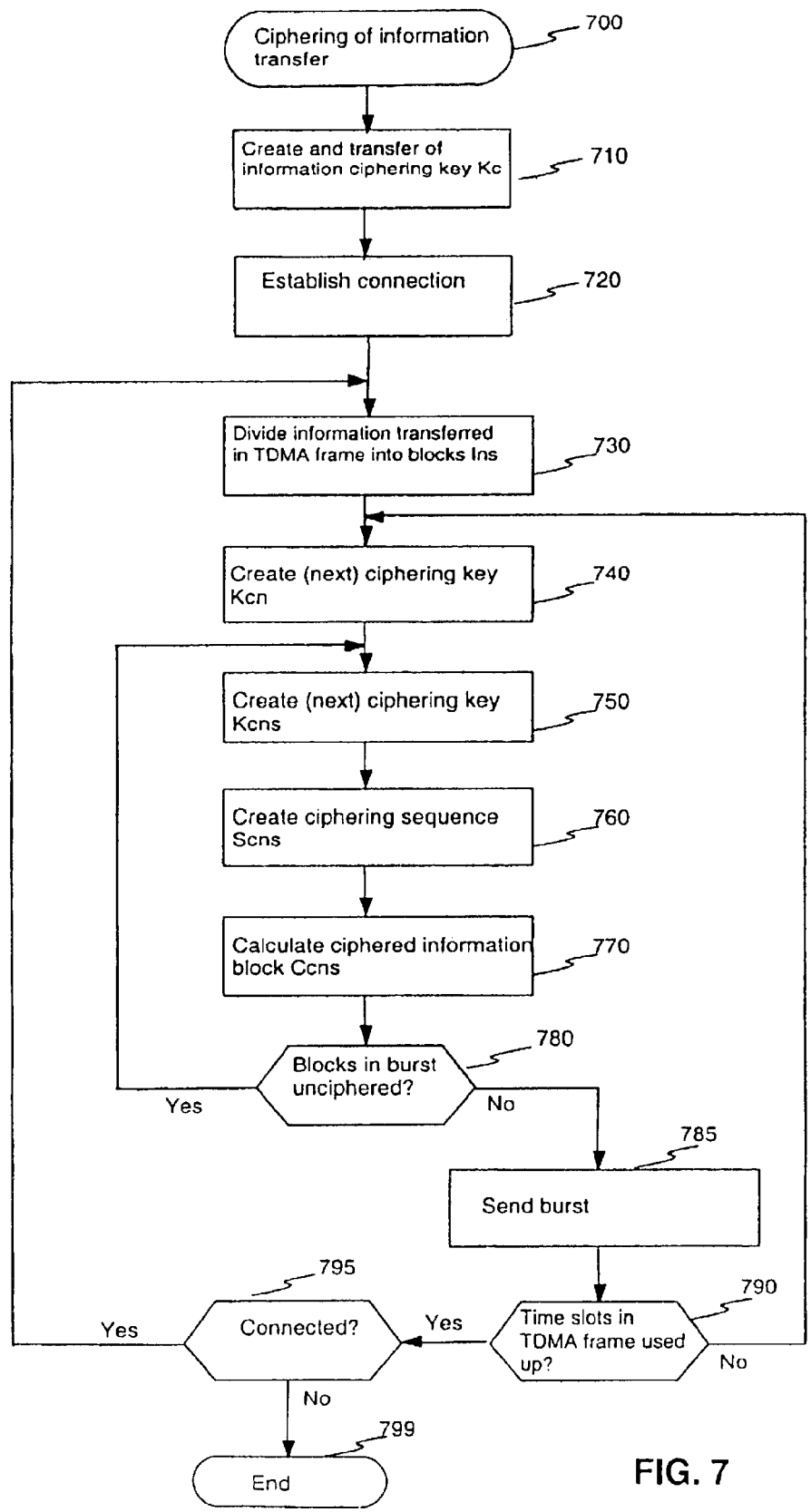
FIG. 7 shows in the form of flow diagram a method according to the invention for ciphering information transfer when the connection uses multiple time slots.

FIG. 7 shows a ciphering method 700 according to the invention in which information transfer in the HSCSD case uses one or more time slots of a TDMA frame. Here, too, a connection specific ciphering key Kc is created first, step 710. After the call has been established, 720, information in each time slot is divided into blocks Ins, step 730. Then, in step 740, a time slot specific ciphering key Kcn is created, where n stands for the number of the time slot in the TDMA frame. The ciphering key Kcn is generated using the connection specific ciphering key Kc and time slot number BN as follows:

$$Kcn(i)=Kc(i) xor(BN<<32(i)) \tag{2}$$

In equation (2), operation <<32 represents a 32-bit shift.

Then, in step 750, a new connection specific ciphering key Kcns is created for the information block in the burst on the basis of the sub-block number BM as follows:

$$Kcns(i)=Kcn(i) xor BMs(i) \tag{3}$$

As mentioned above in conjunction with the description of FIG. 6, xor stands for bitwise binary addition and BM(i) stands for binary encoding of the value of the sub-block number BM into 64 bits. It should be noted here that the time slot number should be indicated using a different part of the bit sequence than that used to indicate the time slot number in the HSCSD solution, lest the effect of the parameters in the multichannel case be canceled. Namely, if the bits in question are summed at the same point of the bit sequence, the reliability of encryption might be degraded because the time slot number and sub-block number are data that a third party could find out. In the HSCSD solution in use, the bits indicating the time slot are situated in the middle of the 64-bit sequence.

The ciphering key produced is used to generate a block specific ciphering sequence Scns in step 760 which is used to calculate the ciphered information block Ccns, step 770. Steps 750 to 770 are repeated until all information blocks in the burst have been ciphered, 780, whereafter the burst is generated and transmitted, 785. Correspondingly, steps 740 to 785 are repeated until all bursts of the time slots used by the connection have been ciphered and transmitted, 790, after which the operation returns 795 to step 730 until the connection is terminated, 799.

Also in the case of a multislot connection, the deciphering in the reception is carried out according to steps corresponding to those used in the ciphering in the transmission.

Figure 8:
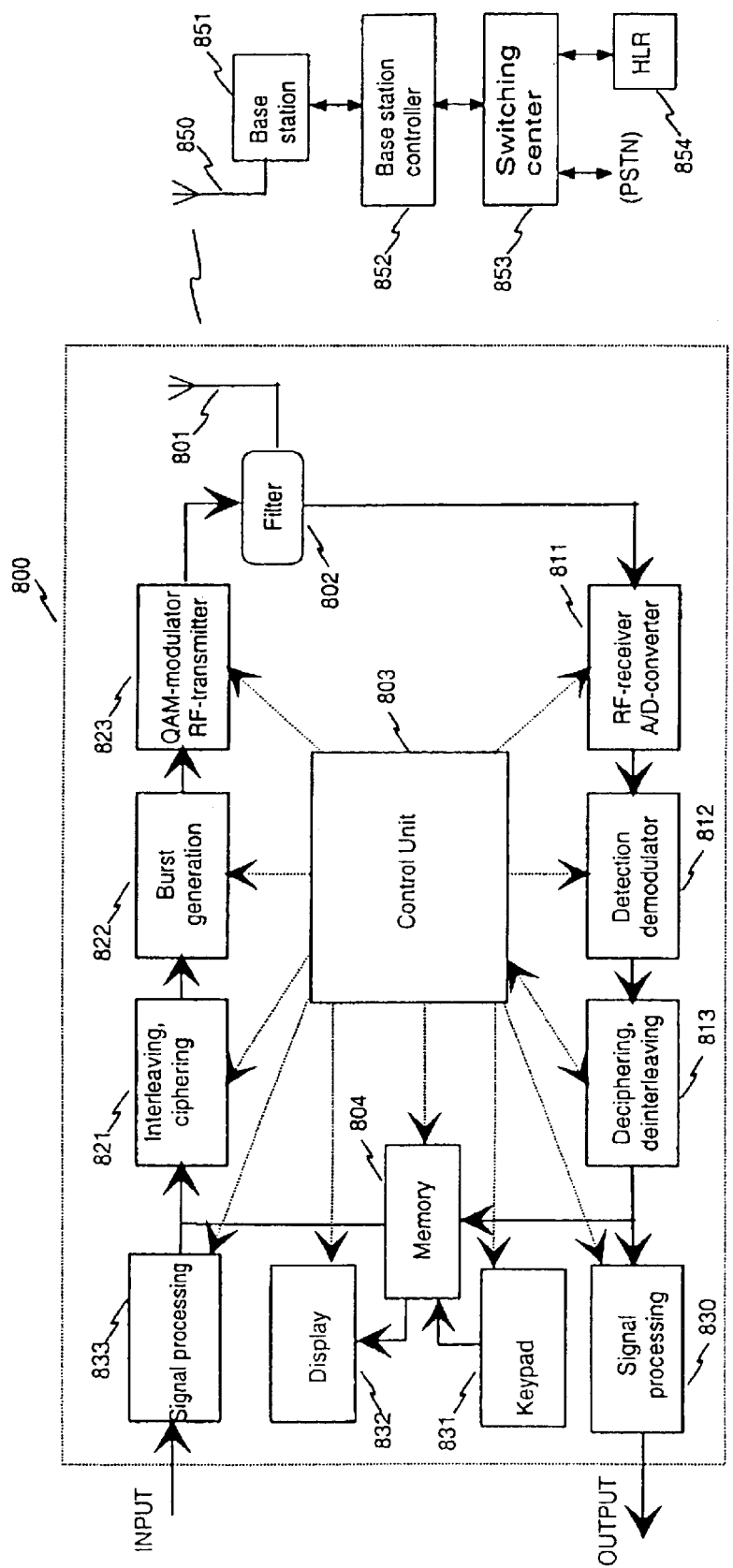
FIG. 8 shows in the form of block diagram a mobile station according to the invention and its connection to a cellular system.

FIG. 8 shows in the form of a simplified block diagram a mobile station 800 according to the invention and its connection to a cellular system. The mobile station comprises an antenna 801 to receive a radio-frequency, or RF, signal sent by a base station. The received RF signal is taken e.g. by means of a duplex filter or switch 802 to a RF receiver 811 where the signal is amplified and converted digital. Then the signal is detected and demodulated in block 812. Block 813 performs deciphering according to the present invention as well as deinterleaving. Signal processing is then performed in block 830 according to whether the information transferred is speech or data. Data can be stored as such in the mobile station's memory 804 or, alternatively, processed data are transferred after signal processing to a possible external device such as a computer. Possible processed speech signal is taken to an earphone (not shown). A control unit controls aforementioned receiving blocks in accordance with a program stored in the unit. The control unit controls block 813 in such a manner that deciphering of data received from the system is carried out as described above.

Transmission from a mobile station in accordance with the invention is carried out e.g. as follows. Controlled by a control unit 803, block 833 performs the signal processing and block 821 performs the interleaving and ciphering according to the invention for the processed signal (data/speech) to be transferred. Bursts are generated from the encoded data in block 822 which are modulated and, amplified into a transmission RF signal, block 823. The RF signal to be transmitted is taken to an antenna 801 via a duplex filter 802, for example. Also the aforementioned processing and transmission functions are controlled by a control unit 803. Especially the control unit controls block 821 in such a manner that the information in each burst is ciphered according to the invention using separate ciphering sequences for each information block. To that end, the control unit reads from the memory 804 the necessary ciphering parameters. In addition, the control unit 803 monitors the SCH channel to receive the COUNT value. The COUNT value is received at the beginning of the connection or when the synchronization is restored after a visit outside the coverage area or in connection with a handover.

In addition, FIG. 8 shows a keypad 831 and display 832 belonging to a normal mobile station. Blocks of a mobile station according to the invention can be formed using known components. However, the control unit controlling the other units carries out the block control functions in accordance with special software, thus realizing the aforementioned block functions according to the invention.

Furthermore, FIG. 8 shows the parts of the cellular system that are used in the call establishment and information transfer. RF signal transmission and reception are carried out through an antenna 850 in a base station 851. An information transfer connection is created from the base station 851 via a base station controller 852 to a switching center 853. In addition to other base station systems of the system, the switching center 853 is connected to a home location register 854 and public switched telephone network PSTN, for example.

On the communications system side, the ciphering and deciphering according to the invention are performed at a base station by means of blocks corresponding to those of a mobile station.

It should be noted that in the downlink and uplink directions of a connection it is possible to use different time slot numbers as well as different ciphering and modulation methods. In addition, the number of time slots used, the size/number of information blocks in a burst and the modulation method can be changed also during the connection.

Above the invention was described using certain embodiments as examples. It is however obvious that the invention is not limited to those embodiments but can be freely modified within the limits defined by the claims set forth below.

It should be especially noted that the invention is not limited to the GSM system but can be well applied to other systems using the TDMA method and also systems using the code division multiple access, or CDMA, method. Similarly, the invention is not limited to the modulation methods mentioned above but it can be applied in conjunction with other modulation methods, too. Furthermore, the invention is not limited to data transfer but can be applied to the transfer of speech as well. The invention also comprises ciphering on those signalling channels where new modulation might be needed. Such channels in the GSM/EDGE system could be e.g. the fast associated control channel FACCH, as well as the SACCH and SDCCH channels. Furthermore, configurations more complex than those described can occur in various situations within the scope of the principle of the invention.

REFERENCES

[1] ETSI STC SMG2 EDGE Tdoc 332/97: Feasibility Study version 1.0, Work Item 184: Improved Data Rates through Optimised Modulation, Ericsson, Nokia, Dec. 1–5, 1997.

[2] Draft ETS 300 929: GSM 03.20—version 5.1.0. Digital cellular telecommunications system (phase 2+); Security related network functions, European Telecommunications standards Institute, March 1997, 51 pp.

What is claimed is:

1. A method for ciphering a mobile communications connection between at least two devices wherein information to be transferred is modulated into at least one burst of a certain fixed length and the information to be transferred is ciphered according to a predetermined algorithm and ciphering key, wherein information transferred in one burst is divided into at least two blocks, the first block is ciphered using a first ciphering key (Kcn1), the second block is ciphered using a second ciphering key (Kcn2), said first and second ciphering keys are different from each other, at least one of said first and second ciphering keys (Kcns) is generated on the basis of a parameter (COUNT) transferred on a radio frequency information transfer channel of the mobile communications connection, and the number of information blocks transferred in a burst is changed during the connection between said two devices.

2. The method of claim 1, characterized in that the size (y) of said block is smaller than the amount of information (Y) transferred in one burst.

3. The method of claim 1, characterized in that the size (y) of the information blocks transferred in a burst is changed during the connection.

4. The method of claim 1, characterized in that said information transfer connection complies with the EDGE system.

5. A system for ciphering an information transfer connection between at least two devices in a communications system, said system comprising means for modulating the information to be transferred into at least one burst of a certain fixed length and means for ciphering the information to be transferred by means of a predetermined algorithm and at least one ciphering key, wherein the system further comprises means for dividing the information transferred in said burst into at least two blocks, and means for ciphering the first block using a first ciphering key and the second block using a second ciphering key, said first and second ciphering keys being different from each other, and the system further comprising means for generating at least one of said first and second ciphering keys on the basis of a parameter transferred on a radio frequency information transfer channel of a mobile communications connection; and wherein the number of information blocks transferred in a burst is changed during the connection between said two devices.

6. A mobile station comprising means for ciphering an information transfer connection with another device, said means including means for modulating the information to be transferred into at least one burst of a certain fixed length and means for ciphering the information to be transferred by means of a predetermined algorithm and at least one ciphering key, wherein the mobile station further comprises means for dividing the information transferred in said burst into at least two blocks, and means for ciphering the first block using a first ciphering key and the second block using a second ciphering key, said first and second ciphering keys being different from each other, and said mobile station further comprising means for generating at least one of said first and second said ciphering keys on the basis of a parameter transferred on a radio frequency information transfer channel of a mobile communications connection; and wherein the number of information blocks transferred in a burst is changed during the connection between said mobile station and said another device.

7. A method for ciphering a mobile communications connection between at least two devices wherein information to be transferred is modulated into at least one burst of a certain fixed length and the information to be transferred is ciphered according to a predetermined algorithm and ciphering key, wherein information transferred in one burst is divided into at least two blocks, the first block is ciphered using a first ciphering key (Kcn1), the second block is ciphered using a second ciphering key (Kcn2), said first and second ciphering keys are different from each other, at least one of said first and second ciphering keys (Kcns) is generated on the basis of a parameter (COUNT) transferred on a radio frequency information transfer channel of the mobile communications connection, and the size (y) of the information blocks transferred in a burst is changed during the connection between said two devices.

8. A system for ciphering an information transfer connection between at least two devices in a communications system, said system comprising means for Modulating the information to be transferred into at least one burst of a certain fixed length and means for ciphering the information to be transferred by means of a predetermined algorithm and at least one ciphering key, wherein the system further comprises means for dividing the information transferred in said burst into at least two blocks, and means for ciphering the first block using a first ciphering key and the second block using a second ciphering key, said first and second ciphering keys being different from each other, and the system further comprising means for generating ciphering key on the basis of a parameter transferred on a radio frequency information transfer channel of a mobile communications connection; and wherein the size (y) of the information blocks transferred in a burst is changed during the connection between said two devices.

9. A mobile station comprising means for ciphering an information transfer connection with another device, said means including means for modulating the information to be transferred into at least one burst of a certain fixed length and means for ciphering the information to be transferred by means of a predetermined algorithm and at least one ciphering key, wherein the mobile station further comprises means for dividing the information transferred in said burst into at least two blocks, and means for ciphering the first block using a first ciphering key and the second block using a second ciphering key, said first and second ciphering keys being different from each other, and said mobile station further comprising means for generating said ciphering key on the basis of a parameter transferred on a radio frequency information transfer channel of a mobile communications connection; and wherein the size (y) of the information blocks transferred in a burst is changed during the connection between said two devices.

* * * * *

UNITED STATES PATENT AND TRADEMARK OFFICE
CERTIFICATE OF CORRECTION

PATENT NO. : 6,813,355 B1
DATED : November 2, 2004
INVENTOR(S) : Hakaste

It is certified that error appears in the above-identified patent and that said Letters Patent is hereby corrected as shown below:

Column 10,
Line 3, delete "Modulating" and insert -- modulating --, therefor.

Signed and Sealed this

Twenty-second Day of March, 2005

JON W. DUDAS
*Director of the United States Patent and Trademark Office*